United States Patent
Kommera et al.

(10) Patent No.: US 10,353,733 B1
(45) Date of Patent: Jul. 16, 2019

(54) SYSTEMS AND METHODS FOR PERFORMING VIRTUAL MACHINE UPDATES WITHOUT REBUILD OF DISTRIBUTED DATABASES THEREON

(71) Applicant: Capital One Services, LLC, McLean, VA (US)

(72) Inventors: Raveender Kommera, Flower Mound, TX (US); Nathan Gloier, Frisco, TX (US); Babitha Bandi, Plano, TX (US); Suresh Gubba, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/150,218

(22) Filed: Oct. 2, 2018

(51) Int. Cl.
  *G06F 9/455* (2018.01)
  *G06F 3/06* (2006.01)
  *G06F 21/31* (2013.01)
  *G06F 9/54* (2006.01)

(52) U.S. Cl.
  CPC ........ *G06F 9/45558* (2013.01); *G06F 3/0614* (2013.01); *G06F 3/0659* (2013.01); *G06F 3/0664* (2013.01); *G06F 9/54* (2013.01); *G06F 21/31* (2013.01); *G06F 2009/45579* (2013.01); *G06F 2009/45595* (2013.01)

(58) Field of Classification Search
  None
  See application file for complete search history.

(56) References Cited

U.S. PATENT DOCUMENTS

| | | | |
|---|---|---|---|
| 5,890,156 | A | 3/1999 | Rekieta et al. |
| 6,324,693 | B1 | 11/2001 | Brodersen et al. |
| 6,405,220 | B1 | 6/2002 | Brodersen et al. |
| 6,604,117 | B2 | 8/2003 | Lim et al. |
| 7,047,287 | B2 | 5/2006 | Sim et al. |

*Primary Examiner* — Gregory A Kessler
(74) *Attorney, Agent, or Firm* — Finnegan, Henderson, Farabow, Garrett & Dunner, LLC

(57) ABSTRACT

The present disclosure relates to systems and methods for updating virtual machines without rebuilding distributed databases thereon. In one example, a system for updating a virtual machine on a cloud service may include at least one processor configured to: generate and transmit, to the cloud service, a first command to disconnect a virtual storage from a first virtual machine; after the virtual storage is disconnected, generate and transmit, to the cloud service, a second command to offline the first virtual machine; generate and transmit, to the cloud service, a third command to build a second virtual machine; after the second virtual machine is built, generate and transmit, to the cloud service, a fourth command to connect the virtual storage to the second virtual machine; and generate and transmit, to the cloud service, a fifth command to online the second virtual machine with the address of the virtual machine.

20 Claims, 5 Drawing Sheets

SYSTEMS AND METHODS FOR PERFORMING VIRTUAL MACHINE UPDATES WITHOUT REBUILD OF DISTRIBUTED DATABASES THEREON

TECHNICAL FIELD

The present disclosure relates generally to the field of virtual machine management. More specifically, and without limitation, this disclosure relates to systems and methods for updating virtual machines on a cloud service without rebuilding distributed databases thereon.

BACKGROUND

Many cloud services provide virtual machines on remote servers for use by subscribers to the cloud services. For example, Amazon Web Services (AWS) provides the Amazon Machine Image (AMI) service to subscribers. A virtual machine is generally an instance of an application executed on a server and accessible via a terminal of a subscriber. Accordingly, a virtual machine typically includes instance storage that is associated with the virtual machine and is unique to the virtual machine instance.

Many cloud services also provide distributed databases for use by subscribers. For example, Amazon Web Services (AWS) provides Cassandra database management for subscribers. A distributed database generally includes entries stored by one or more nodes in a network of nodes, the full database being provided by the network of nodes.

Accordingly, one or more databases may be distributed across a plurality of virtual machines provided by a cloud service. However, implementing a distributed database on virtual machines increases the difficulty in updating the virtual machines. For example, if the application providing the virtual machines is updated, the old instances must be terminated and new instances initiated in order to ensure that the virtual machines are provided by the updated application. However, this requires substantial time to re-create the distributed database, either through a manual backup and of each node of the database on an old instance and corresponding rebuild on a new instance or through a duplication of the distributed database across a plurality of new instances before terminating the old instances.

SUMMARY

In view of the foregoing, embodiments of the present disclosure describe systems and methods for updating virtual machines on a cloud service without rebuilding distributed databases on the virtual machines The provided systems allow for re-initiating of virtual machine instances without rebuild of distributed database nodes provided by the instances. Accordingly, the systems provided herein may provide for faster updating of virtual machines that provide nodes of a distributed database.

Embodiments of the present disclosure may use raw block storages to implement the above-noted technical improvements. In particular, systems may use raw block storages to preserve nodes of the distributed database during termination of old instances and initiation of new instances of the virtual machines.

In one embodiment, the present disclosure describes a system for updating a virtual machine on a cloud service. The system may comprise at least one memory storing instructions and at least one processor configured to execute the instructions to perform one or more operations. The operations may comprise generating a first command to disconnect a virtual storage from a first virtual machine and transmitting the first command to the cloud service; after the virtual storage is disconnected, generating a second command to offline the first virtual machine and transmitting the second command to the cloud service; generating a third command to build a second virtual machine and transmitting the third command to the cloud service; after the second virtual machine is built, generating a fourth command to connect the virtual storage to the second virtual machine and transmitting the fourth command to the cloud service; and generating a fifth command to online the second virtual machine with the address of the virtual machine and transmitting the fifth command to the cloud service.

In one embodiment, the present disclosure describes a system for updating a virtual machine executed as an instance on one or more remote servers. The system may comprise at least one memory storing instructions and at least one processor configured to execute the instructions to perform one or more operations. The operations may comprise generating a first command to unmount a virtual storage from a first virtual machine executed as an instance on the one or more remote servers and transmitting the first command to the one or more remote servers; after the virtual storage is unmounted, generating a second command to terminate the instance and transmitting the second command to the one or more remote servers; generating a third command to boot a second virtual machine as a new instance and transmitting the third command to the one or more remote servers; after the new instance is booted, generating a fourth command to mount the virtual storage on the new virtual machine and transmitting the fourth command to the one or more remote servers; and generating a fifth command to assign an address of the first virtual machine to the second virtual machine and transmitting the fifth command to the one or more remote servers.

In one embodiment, the present disclosure describes a system for updating a virtual machine on a cloud service. The system may comprise at least one communications interface connected to the cloud service, at least one memory storing instructions, and at least one processor configured to execute the instructions to perform one or more operations. The operations may comprise generating a first command to disconnect a virtual storage from a first virtual machine, the first virtual machine having an address, and transmitting the first command to the cloud service using the at least one communications interface; after the virtual storage is disconnected, generating a second command to remove the first virtual machine from a cluster including the first virtual machine and transmitting the second command to the cloud service using the at least one communications interface; generating a third command to offline the virtual machine and transmitting the third command to the cloud service using the at least one communications interface; after the first virtual machine is offline, generating a fourth command to build a second virtual machine and transmitting the fourth command to the cloud service; after the second virtual machine is built, generating a fifth command to connect the virtual storage to the second virtual machine and transmitting the fifth command to the cloud service using the at least one one communications interface; and generating a sixth command to add the second virtual machine to the cluster with the address of the first virtual machine and transmitting the sixth command to the cloud service using the at least one communications interface.

In one embodiment, the present disclosure describes a cloud service hosting a virtual machine having an address.

The cloud service may comprise at least one memory storing instructions and at least one processor configured to execute the instructions to perform one or more operations. The operations may comprise disconnecting a virtual storage from a first virtual machine; after the virtual storage is disconnected, offlining the first virtual machine; building a second virtual machine; after the second virtual machine is built, connecting the virtual storage to the second virtual machine; and onlining the second virtual machine with an address of the first virtual machine.

In one embodiment, the present disclosure describes a remote server providing a virtual machine. The server may comprise at least one memory storing instructions and at least one processor configured to execute the instructions to perform one or more operations. The operations may comprise unmounting a virtual storage mounted to a first virtual machine, the first virtual machine executed as an instance; after the virtual storage is unmounted, terminating the instance; booting a second virtual machine as a new instance; after the new instance is booted, mounting the virtual storage on the second virtual machine; and assigning an address of the first virtual machine to the second virtual machine.

In one embodiment, the present disclosure describes a cloud service providing a virtual machine and providing for updating the virtual machine. The cloud service may comprise at least one communications interface connected to a terminal, at least one memory storing instructions, and at least one processor configured to execute the instructions to perform one or more operations. The operations may comprise receiving a first command from a terminal to disconnect a virtual storage from a virtual machine, the first virtual machine having an address, and disconnecting the virtual storage in response to the first command; receiving a second command from the terminal to remove the first virtual machine from the cluster and, after the virtual storage is disconnected, removing the first virtual machine from the cluster in response to the second command; receiving a third command from the terminal to offline the first virtual machine and offlining the first virtual machine in response to the third command; receiving a fourth command from the terminal to build a second virtual machine and, after the first virtual machine is offline, building the second virtual machine in response to the fourth command; receiving a fifth command from the terminal to connect the virtual storage to the second virtual machine and, after the second virtual machine is built, connecting the virtual storage in response to the fifth command; and receiving a sixth command from the terminal to add the second virtual machine to the cluster with the address of the first virtual machine and adding the second virtual machine in response to the sixth command.

In some embodiments, the present disclose describes non-transitory, computer-readable media for causing one or more processors to execute methods consistent with the present disclosure.

It is to be understood that the foregoing general description and the following detailed description are example and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles disclosed herein. In the drawings.

DETAILED DESCRIPTION

Figure 1:
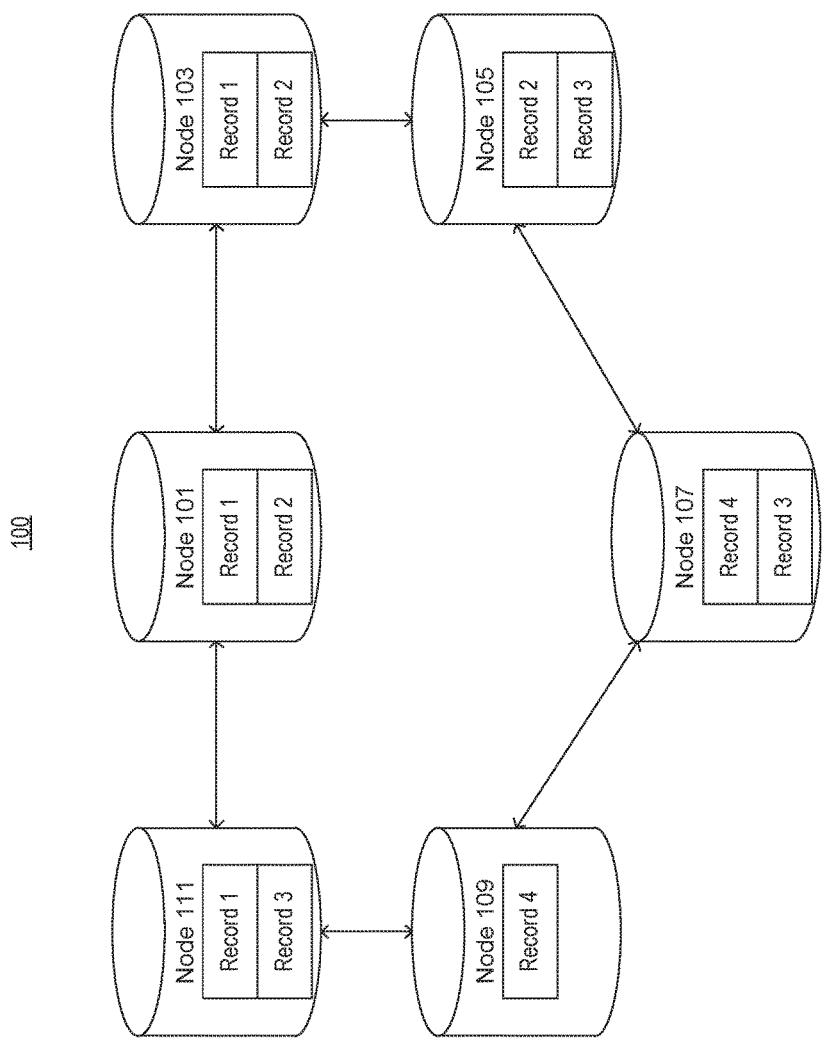
FIG. 1 is a block diagram of a system for implementing a distributed database.

The disclosed embodiments relate to systems and methods for updating virtual machines on a cloud service without rebuilding distributed databases thereon. Embodiments of the present disclosure may be implemented using a general-purpose computer. Alternatively, a special-purpose computer may be built according to embodiments of the present disclosure using suitable logic elements.

Advantageously, disclosed embodiments may solve the technical problem of re-initiating virtual machines with an updated application while reducing time usually spent re-building distributed database nodes provided by the virtual machines. Moreover, disclosed embodiments may solve the technical problem of automating the previously manual processes of re-initiating the virtual machines and re-building the distributed database nodes.

According to an aspect of the present disclosure, a user terminal may generate and transmit commands to perform the virtual machine update. The user terminal may comprise a desktop, a laptop, or other computing device having at least one processor. For example, to update a virtual machine on a cloud service, at least one processor may generate a first command to disconnect (or unmount) a virtual storage from a first virtual machine. The first command (and any other commands described below) may comprise an application programming interface (API) call.

As explained further below with respect to FIG. 2, the virtual machine may be executed as an instance on one or more remote servers. For example, the instance may comprise an instance of an operating system, such as a Linux operating system or a Windows operating system, executed by the one or more remote servers. The operating system may be executed within a read-only filesystem image. As explained further below with respect to FIG. 2, the image may be loaded by the application or the image may include a pointer to a kernel from an approved list of kernels maintained by the one or more remote servers. Additionally, the image may include a block device mapping that mounts a virtual storage on the first virtual machine.

The first virtual machine may have an address on the cloud service. For example, the address may comprise an Internet protocol (IP) address. The address may be dynamically assigned by the cloud service or may be statically assigned by a user of the cloud service that initiated the instance.

The at least one processor may transmit the first command to the cloud service. For example, the at least one processor may transmit the first command at least one communications interface, such as a network interface controller (NIC). The at least one processor may send the first command over one or more computer networks, such as the Internet, a local area network (LAN), or the like, and using WiFi, 4G, Ethernet, or the like. In some embodiments, to retain security, the at least one processor may send the first command over a private network (such as a LAN or the like) and/or may encrypt the first command (e.g., using an Advanced Encryption Standard (AES) or the like).

In some embodiments, before the first virtual is offlined and/or terminated (as described below), the at least one processor may generate a sixth command to transfer data from a first instance store of the first virtual machine to the virtual storage. The sixth command may also be generated before the virtual storage is disconnected (or unmounted). The at least one processor may transmit the sixth command to the cloud service. For example, as explained above, the at least one processor may transmit the sixth command via at least one communications interface, such as an NIC.

After the virtual storage is disconnected (or unmounted), the at least one processor may generate a second command to offline the first virtual machine and/or to terminate the instance comprising the first virtual machine. In some embodiments, the at least one processor may first generate (and transmit) a command to remove the first virtual machine from a cluster including the first virtual machine before generating (and transmitting) the second command.

The at least one processor may transmit the second command to the cloud service. For example, as explained above, the at least one processor may transmit the second command via at least one communications interface, such as an NIC.

The at least one processor may further generate a third command to build (or boot) a second virtual machine. For example, the second virtual machine may be built or booted as a new instance on one or more remote servers. The at least one processor may generate the command after the first virtual machine is offline and/or terminated.

The at least one processor may transmit the third command to the cloud service. For example, as explained above, the at least one processor may transmit the third command via at least one communications interface, such as an NIC.

In some embodiments, the second virtual machine may be built using an updated version of an application as compared to a version of the application that built the first virtual machine. For example, the cloud service may provide the updated version for new virtual machines while supporting an older version for already-built virtual machines. In such embodiments, the application may include a template for a root volume forming the basis of the first virtual machine. Accordingly, the updated version may include a newer template as compared to an older template included in a previously version of the application.

After the second virtual machine is built (e.g., after the new instance is booted), the at least one processor may generate fourth command to connect the virtual storage to (or mount the virtual storage on) the second virtual machine. The at least one processor may transmit the fourth command to the cloud service. For example, as explained above, the at least one processor may transmit the fourth command via at least one communications interface, such as an NIC.

The at least one processor may further generate a fifth command to online the second virtual machine with the address of the first virtual machine and/or to add the second virtual machine to the cluster with the address of the first virtual machine. In some embodiments, the second virtual machine may online when built or booted. In such embodiments, the fifth command may assign an address of the first virtual machine to the second virtual machine.

The at least one processor may transmit the fifth command to the cloud service. For example, as explained above, the at least one processor may transmit the fifth command via at least one communications interface, such as an NIC.

In embodiments where the at least one processor also generates the sixth command described above, the at least one processor may further generate a seventh command to transfer the data from the virtual storage to a second instance store of the second virtual machine. The at least one processor may transmit the seventh command to the cloud service. For example, as explained above, the at least one processor may transmit the seventh command at least one communications interface, such as an NIC.

In some embodiments, the cloud service may implement one or more security protocols. Accordingly, the user terminal may transmit credentials to the cloud service to authenticate itself. For example, the user terminal may transmit the credentials before transmitting any of the commands described above.

Alternatively, the user terminal may receive a request for credentials from the one or more remote servers, and, in response to the request, transmit credentials to the one or more remote servers to authenticate the system. For example, the user terminal may receive the request in response to a transmittal of the first command or other attempt to open a connection between the user terminal and the one or more remote servers.

In any of the embodiments described above, the credentials may comprise at least one of a username and a password or may comprise an authentication key obtained by the at least one processor. For example, the user terminal may transmit the credentials to the cloud service, or the cloud service may obtain the credentials from a key distribution center or other centralized credentialing service at the request of the user terminal.

According to another aspect of the present disclosure, a cloud service may perform the virtual machine update. The cloud service may comprise one or more remote servers or any other computing device providing a virtual machine to one or more customers. For example, a cloud service hosting a virtual machine having an address may disconnect (or unmount) a virtual storage from a first virtual machine. For example, the cloud service may disconnect the virtual storage in response to a first command received from a terminal (e.g., as described above).

In some embodiments, the first virtual machine may be executed as an instance. As explained above and further below with respect to FIG. 2, the instance may comprise an instance of an operating system, such as a Linux operating system or a Windows operating system, executed by the one or more remote servers. The operating system may be executed within a read-only filesystem image.

As explained above, the first virtual machine may have an address on the cloud service. For example, the address may comprise an IP address that is dynamically or statically assigned.

In some embodiments, before the first virtual machine is offlined and/or terminated (as described below), the cloud service may transfer data from a first instance store of the first virtual machine to the virtual storage. For example, the cloud service may transfer the data in response to a sixth command received from a terminal (e.g., as described above).

After the virtual storage is disconnected (or unmounted), the cloud service may offline the first virtual machine and/or terminate the instance. In some embodiments, the cloud service may remove the first virtual machine from a cluster including the first virtual machine. For example, the cloud service may offline or terminate the virtual machine and/or remove the first virtual machine from the cluster in response to a second command received from a terminal (e.g., as described above).

The cloud service may further build (or boot) a second virtual machine. For example, the cloud service may build or boot the second virtual machine in response to a third command received from a terminal (e.g., as described above).

In some embodiments, the first virtual machine may be executed as a new instance. As explained above, the second virtual machine may be executed as an instance of an updated version of an application as compared to a version of the application that served as the instance for the first virtual machine.

After the second virtual machine is built or booted, the cloud service may connect the virtual storage to (or mount the virtual storage on) the second virtual machine. For example, the cloud service may build or boot the second virtual machine in response to a fourth command received from a terminal (e.g., as described above).

The cloud service may further online the second virtual machine with an address of the first virtual machine and/or add the second virtual machine to the cluster with the address of the first virtual machine. For example, the cloud service may online the second virtual machine and/or add the virtual machine to the cluster in response to a fifth command received from a terminal (e.g., as described above). In some embodiments, the second virtual machine may online when built or booted. In such embodiments, the cloud service may simply assign an address of the first virtual machine to the second virtual machine.

In embodiments where the cloud service transfers data from the first instance store of the first virtual machine to the virtual storage, as described above, the cloud service may further transfer the data from the virtual storage to a second instance store of the second virtual machine. For example, the cloud service may transfer the data in response to a seventh command received from a terminal (e.g., as described above).

In some embodiments, the cloud service may implement one or more security protocols. Accordingly, the cloud service may receive credentials from a terminal requesting the update and use the credentials to authenticate the terminal. For example, the cloud service may authenticate the terminal before performing any of the steps described above.

Alternatively, the cloud service may transmit a request for credentials to a terminal requesting the update; in response to the request, receive credentials from the terminal; and authenticate the terminal using the received credentials. For example, the cloud service may transmit the request in response to receiving a command from the terminal or other attempt to open a connection between the terminal and the one or more remote servers.

In any of the embodiments described above, the credentials may comprise at least one of a username and a password or may comprise an authentication key obtained by the terminal. For example, the terminal may transmit the credentials to the cloud service, or the cloud service may obtain the credentials from a key distribution center or other centralized credentialing service at the request of the terminal.

In FIG. 1, there is shown a block diagram of a system 100 for implementing a distributed database. As depicted in FIG. 1, system 100 may comprise a plurality of nodes, e.g., nodes 101, 103, 105, 107, 109, and 111. A "node" may comprise at least one storage device storing one or more records of the distributed database, at least one processor managing the stored records, and at least one network interface controller for receiving requests and transmitting records in response to requests. In some embodiments, the at least one processor of each node may also determine whether to respond to received requests and/or to forward received requests to one or more other nodes of the distributed database.

As further depicted in FIG. 1, system 100 may index and store records across the plurality of nodes. For example, records 1, 2, and 3 are each stored across three nodes (nodes 101, 103, and 111; nodes 101, 103, and 105; and nodes 105, 107, and 111, respectively), and record 4 is stored across two nodes (nodes 107 and 109). The number of nodes across which records are stored and/or the specific nodes in which each record is stored may be governed by an overall policy for system 100. For example, a policy may dictate that each record be stored on three nodes, that certain records be stored on four nodes and other records be stored on two nodes, or the like. Additionally or alternatively, a policy may dictate that each node store no more than two records, no more than four records, or the like.

Figure 2:
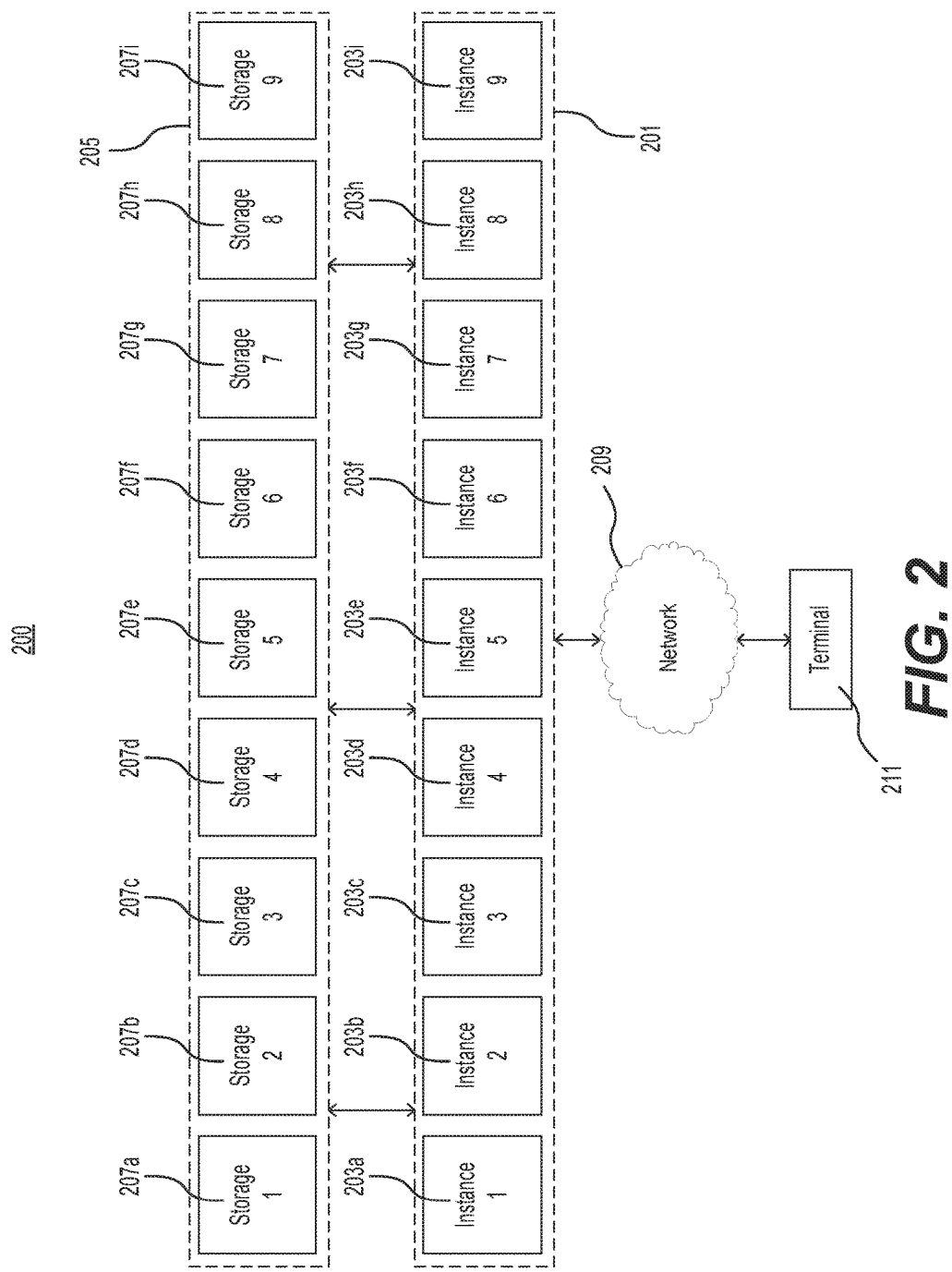
FIG. 2 is a block diagram of a cloud service providing virtual machine instances and raw block storages, according to an example embodiment of the present disclosure.

In FIG. 2, there is shown a block diagram of a cloud service 200 providing virtual machine instances and raw block storages. For example, the cloud service 200 may provide a platform 201 for a plurality of virtual machines. Platform 201 may comprise a plurality of servers or any other collection of processors and memories configured to provide the plurality of virtual machines.

As further depicted in FIG. 2, platform 201 may provide the plurality of virtual machines as instances of an application, e.g., instances 203a, 203b, 203c, 203d, 203e, 203f, 203g, 203h, and 203i. The instances may each include a read-only filesystem image that includes an operating system (such as a Linux® operating system, a Windows® operating system, or the like). In some embodiments, each instance may include any additional software desired by a user of the virtual machine. The filesystem image may be based on a template for a root volume of the instance.

In some embodiments, the instance may include an image of the kernel representing the operating system. Alternatively, the instance may include a pointer to a kernel approved by the cloud service. For example, the cloud service may include a list of approved kernels on one or more storage devices (not shown) such that each instance may include a pointer to a kernel image on the list and in the one or more storage devices.

In some embodiments, instance may also include permissions. For example, the instance may include permissions indicating which users of cloud service 200 are permitted to initiate the instance, access the instance, terminate the instance, utilize certain applications within the instance, or the like. The permissions may be implemented using credentials (such as a password, a personal identification number (PIN), or the like), keys (such as a private key, a secret key, or the like), or the like.

As further depicted in FIG. 2, the instances may be connected to a block-level storage 205. For example, block-level storage 205 may include a plurality of virtual raw block devices, such as storages 207a, 207b, 207c, 207d, 207e, 207f, 207g, 207h, and 207i. In some embodiments, the instances may include mappings that specify the storage volumes to attach to the instances attach once launched. The block-level storage 205 may be persistent between instances as compared with instance-specific storage (not shown).

Cloud service 200 may be accessible over one or more computer networks, such as network 209. For example, network 209 may comprise a LAN, the Internet, or other network. Terminal 211 may use network 209 to access cloud service 200. For example, terminal 211 may be associated with a user of cloud service 200 and may comprise a desktop, a laptop, or other computing device that the user may use to send commands to cloud service 200 and utilize services provided by cloud service 200.

Figure 3:
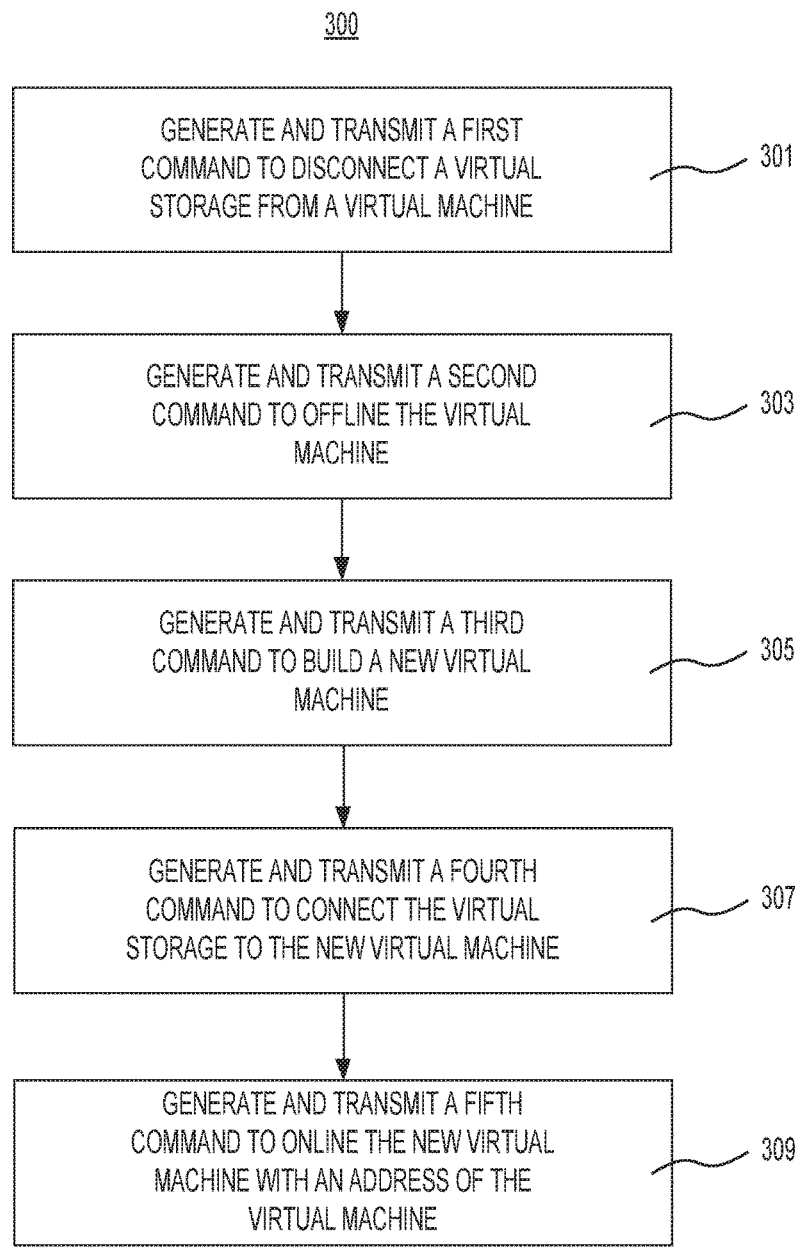
FIG. 3 is a flowchart of an example method for updating a virtual machine on a cloud service, according to an example embodiment of the present disclosure.

FIG. 3 depicts an example method 300 for updating a virtual machine on a cloud service. Method 300 may be implemented using one or more processors (e.g., processor 503 of FIG. 5). As explained above, any of the commands of method 300 may comprise application programming interface (API) calls.

At step 301, the processor may generate and transmit a first command to disconnect (or unmount) a virtual storage from a first virtual machine. For example, the virtual storage may comprise a virtual raw block device, such as storages 207a, 207b, 207c, 207d, 207e, 207f, 207g, 207h, and 207i of FIG. 2, described above. Moreover, the first virtual machine may be executed as an instance of an application on one or more remote servers, such as instances 203a, 203b, 203c, 203d, 203e, 203f, 203g, 203h, and 203i of FIG. 2, described above.

In some embodiments, before step 301, the processor may generate and transmit a command to transfer data from a first instance store of the first virtual machine to the virtual storage. For example, the instance storage may comprise storage provided with the instance comprising the first virtual machine and that is removed upon offlining of the first virtual machine (or terminating of the instance comprising the first virtual machine). The virtual storage, however, may be persistent, as described above with respect to FIG. 2.

At step 303, the processor may generate and transmit a second command to offline the first virtual machine and/or to terminate the instance comprising the first virtual machine. In some embodiments, the first virtual machine may be located on a cluster. For example, the first virtual machine may comprise a node on a cluster providing a distributed database, such as nodes 101, 103, 105, 107, 109, and 111 of FIG. 1, described above. Accordingly, the processor may generate and transmit a second command to remove the first virtual machine from the cluster including the first virtual machine. Therefore, the command to offline the first virtual machine and/or to terminate the instance comprising the first virtual machine may comprise a third command.

At step 305, the processor may generate and transmit a third command to build (or boot) a second virtual machine. For example, as explained above the second virtual machine may be built or booted as a new instance of the application on one or more remote servers. Accordingly, the second virtual machine may be executed as an instance such as instances 203a, 203b, 203c, 203d, 203e, 203f, 203g, 203h, and 203i of FIG. 2, described above.

At step 307, the processor may generate and transmit a fourth command to connect the virtual storage to (or mount the virtual storage on) the second virtual machine. For example, the processor may update a block device mapping of the second virtual machine in order to mount the virtual storage on the second virtual machine.

At step 309, the processor may generate and transmit a fifth command to online the second virtual machine with an address of the first virtual machine. For example, the first virtual machine may have an IP address on the cloud service, and the fifth command may online the second virtual machine with the same IP address. In some embodiments, the second virtual machine may online when built or booted. In such embodiments, the fifth command may simply assign an address of the first virtual machine to the second virtual machine.

In embodiments where the first virtual machine is located on a cluster (e.g., the first virtual machine comprises a node on a cluster providing a distributed database, such as nodes 101, 103, 105, 107, 109, and 111 of FIG. 1, described above), the processor may additionally or alternatively add the second virtual machine to the cluster with the address of the first virtual machine.

Method 300 may include additional steps. For example, method 300 may further include generating and transmitting a seventh command to transfer data from the virtual storage to a second instance store of the second virtual machine. For example, the first instance store may have been transferred to the virtual storage before termination of the first instance such that the second instance store now includes data of the first instance store.

Figure 4:
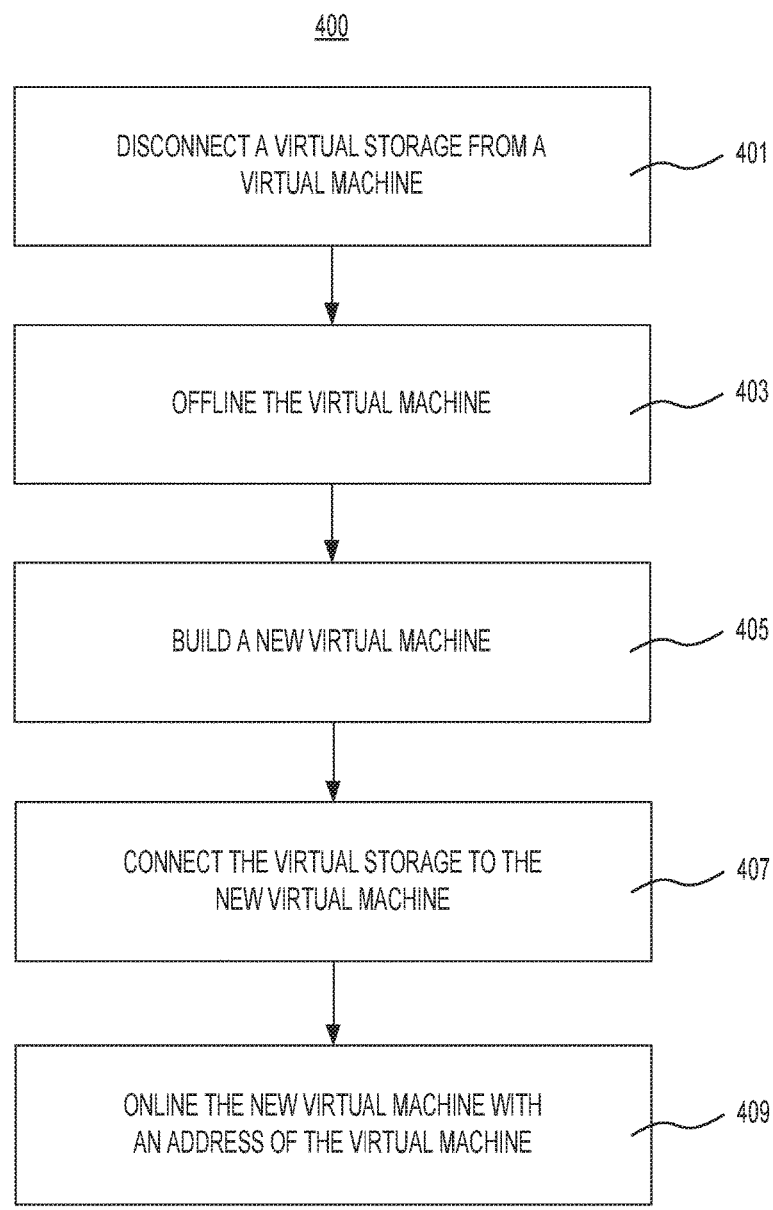
FIG. 4 is a flowchart of an example method for hosting a virtual machine and updating the same, according to an example embodiment of the present disclosure.

FIG. 4 depicts an example method 400 for hosting a virtual machine and updating the same. Method 400 may be implemented using one or more processors (e.g., processor 503 of FIG. 5). Method 400 may represent a method performed by one or more remote services providing a cloud service and may thus correspond to steps performed by a (user) terminal in accordance with method 300 described above. Accordingly, one or more steps of method 400 may be performed in response to commands generated and transmitted in accordance with method 300.

At step 401, the processor may disconnect (or unmount) a virtual storage from a first virtual machine. For example, the cloud service may disconnect the virtual storage in response to a command received from a terminal (e.g., as described above with respect to step 301).

As explained above, the virtual storage may comprise a virtual raw block device, such as storages 207a, 207b, 207c, 207d, 207e, 207f, 207g, 207h, and 207i of FIG. 2. Moreover, the first virtual machine may be executed as an instance of an application on one or more remote servers, such as instances 203a, 203b, 203c, 203d, 203e, 203f, 203g, 203h, and 203i of FIG. 2, described above.

In some embodiments, before step 401, the processor may transfer data from a first instance store of the first virtual machine to the virtual storage. For example, the instance storage may comprise storage provided with the instance comprising the first virtual machine and that is removed upon offlining of the first virtual machine (or terminating of the instance comprising the first virtual machine). The virtual storage, however, may be persistent, as described above with respect to FIG. 2.

At step 403, the processor may offline the first virtual machine and/or terminate the instance. For example, the cloud service may disconnect the virtual storage in response to a command received from a terminal (e.g., as described above with respect to step 303).

In some embodiments, the first virtual machine may be located on a cluster. For example, as explained above, the first virtual machine may comprise a node on a cluster providing a distributed database, such as nodes 101, 103, 105, 107, 109, and 111 of FIG. 1. Accordingly, the cloud service may remove the first virtual machine from the cluster including the first virtual machine.

At step 405, the processor may further build (or boot) a second (or new) virtual machine. For example, the cloud service may build or boot the second virtual machine in response to a command received from a terminal (e.g., as described above with respect to step 305). As explained above the second (or new) virtual machine may be built or booted as a new instance of the application on one or more remote servers. Accordingly, the second virtual machine may be executed as an instance such as instances 203a, 203b, 203c, 203d, 203e, 203f, 203g, 203h, and 203i of FIG. 2, described above.

At step 407, the processor may connect the virtual storage to (or mount the virtual storage on) the second virtual machine. For example, the cloud service may build or boot the second virtual machine in response to a command received from a terminal (e.g., as described above with respect to step 307).

At step 409, the processor may online the second virtual machine with an address of the first virtual machine. For example, the cloud service may build or boot the second virtual machine in response to a command received from a terminal (e.g., as described above with respect to step 309). In some embodiments, the first virtual machine may have an IP address on the cloud service, and the processor may online the second virtual machine with the same IP address. In other embodiments, the second virtual machine may online when built or booted, and the processor may simply assign an address of the first virtual machine to the second virtual machine.

In embodiments where the first virtual machine is located on a cluster (e.g., the first virtual machine comprises a node on a cluster providing a distributed database, such as nodes 101, 103, 105, 107, 109, and 111 of FIG. 1, described above), the processor may additionally or alternatively add the second virtual machine to the cluster with the address of the first virtual machine.

Method 400 may include additional steps. For example, as explained above, method 400 may further include transferring data from the virtual storage to a second instance store of the second virtual machine. For example, the first instance store may have been transferred to the virtual storage before termination of the first instance such that the second instance store now includes data of the first instance store (as described above with respect to method 300).

Figure 5:
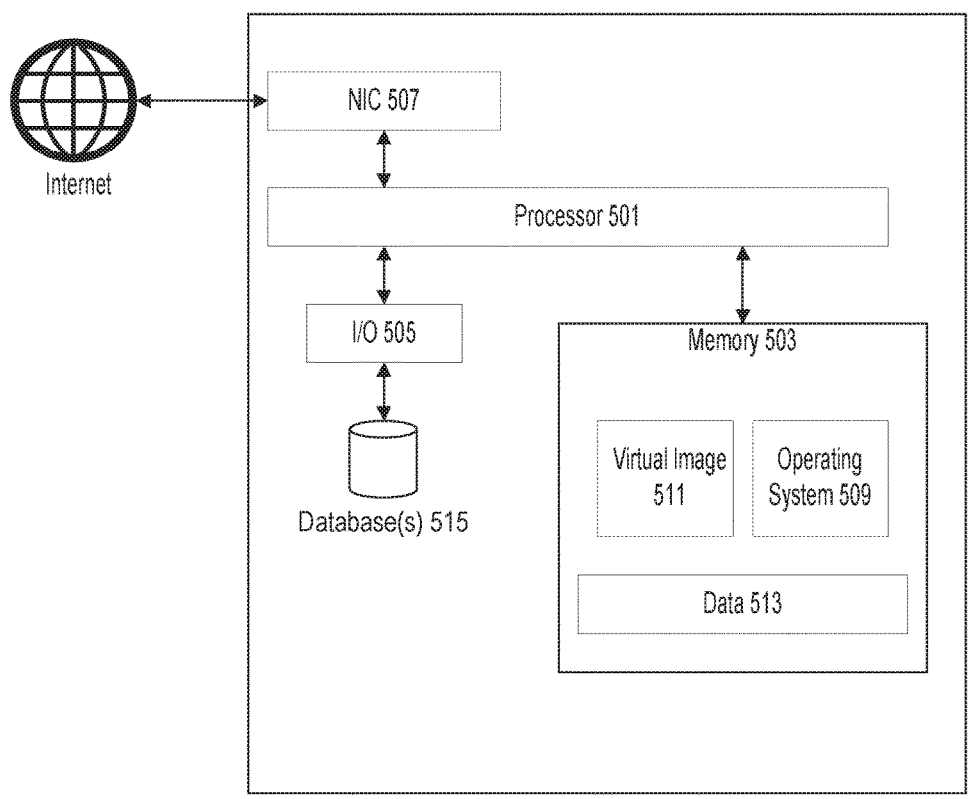
FIG. 5 is a block diagram of an example server with which the systems, methods, and apparatuses of the present disclosure may be implemented.

FIG. 5 is block diagram of an example device 500 suitable for implementing the disclosed systems and methods. For example, device 500 may comprise a server that executes method 400 of FIG. 4.

As depicted in FIG. 5, server 500 may have a processor 501. Processor 501 may comprise a single processor or a plurality of processors. For example, processor 501 may comprise a CPU, a GPU, a reconfigurable array (e.g., an FPGA or other ASIC), or the like.

Processor 501 may be in operable connection with a memory 503, an input/output module 505, and a network interface controller (NIC) 507. Memory 503 may comprise a single memory or a plurality of memories. In addition, memory 503 may comprise volatile memory, non-volatile memory, or a combination thereof. As depicted in FIG. 5, memory 503 may store one or more operating systems 509 and a virtual image 511. For example, virtual image 511 may comprise an instance of an application executed to provide a virtual machine. Accordingly, processor 501 may execute all or part of method 400 of FIG. 4 to update virtual image 511. In addition, memory 503 may store data 513 produced by, associated with, or otherwise unrelated to operating system 509 and/or virtual image 511.

Input/output module 505 may store and retrieve data from one or more databases 515. For example, database(s) 515 may include filesystem images for use in providing virtual image 511 and/or approved kernels for use as virtual image 511, as described above.

NIC 507 may connect server 500 to one or more computer networks. In the example of FIG. 5, NIC 507 connects server 500 to the Internet. Server 500 may receive data and instructions over a network using NIC 507 and may transmit data and instructions over a network using NIC 507.

Each of the above identified instructions and applications may correspond to a set of instructions for performing one or more functions described above. These instructions need not be implemented as separate software programs, procedures, or modules. Disclosed memories may include additional instructions or fewer instructions. Furthermore, server 500 may receive commands from a user terminal executing method 300 of FIG. 3. Accordingly, server 500 may execute method 400 of FIG. 4. These functions of the user terminal and/or server 500 may be implemented in hardware and/or in software, including in one or more signal processing and/or application specific integrated circuits.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for updating a virtual machine on a cloud service, the system comprising:
   at least one memory storing instructions; and
   at least one processor configured to execute the instructions to perform one or more operations, the operations comprising:
      generating a first command to disconnect a virtual storage from a first virtual machine and transmitting the first command to the cloud service;
      after the virtual storage is disconnected, generating a second command to offline the first virtual machine and transmitting the second command to the cloud service;
      generating a third command to build a second virtual machine and transmitting the third command to the cloud service;
      after the second virtual machine is built, generating a fourth command to connect the virtual storage to the second virtual machine and transmitting the fourth command to the cloud service; and
      generating a fifth command to online the second virtual machine with the address of the virtual machine and transmitting the fifth command to the cloud service.

2. The system of claim 1, wherein the operations further comprise transmitting credentials to the cloud service to authenticate the system.

3. The system of claim 2, wherein the credentials comprise at least one of a username and a password.

4. The system of claim 2, wherein the credentials comprise an authentication key obtained by the at least one processor.

5. The system of claim 1, wherein the address comprises an Internet protocol (IP) address.

6. The system of claim 1, wherein the operations further comprise:
   generating a sixth command to transfer data from a first instance store of the first virtual machine to the virtual storage before offlining the virtual machine and transmitting the sixth command to the cloud service, and
   generating a seventh command to transfer the data from the virtual storage to a second instance store of the second virtual machine and transmitting the seventh command to the cloud service.

7. The system of claim 1, wherein the commands comprise application programming interface (API) calls.

8. The system of claim 1, wherein the first virtual machine comprises an instance of an operating system executed on the cloud service.

9. The system of claim 8, wherein the operating system comprises a Linux operating system or a Windows operating system.

10. The system of claim 1, wherein the second virtual machine is built using an updated version of an application as compared to a version of the application that built the first virtual machine.

11. The system of claim 10, wherein the application includes a template for a root volume forming the basis of the first virtual machine.

12. A system for updating a virtual machine executed as an instance on one or more remote servers, the system comprising:
   at least one memory storing instructions; and
   at least one processor configured to execute the instructions to perform one or more operations, the operations comprising:
      generating a first command to unmount a virtual storage from a first virtual machine executed as an instance on the one or more remote servers and transmitting the first command to the one or more remote servers;
      after the virtual storage is unmounted, generating a second command to terminate the instance and transmitting the second command to the one or more remote servers;
      generating a third command to boot a second virtual machine as a new instance and transmitting the third command to the one or more remote servers;
      after the new instance is booted, generating a fourth command to mount the virtual storage on the new virtual machine and transmitting the fourth command to the one or more remote servers; and
      generating a fifth command to assign an address of the first virtual machine to the second virtual machine and transmitting the fifth command to the one or more remote servers.

13. The system of claim 12, wherein the operations further comprise:
   receiving a request for credentials from the one or more remote servers, and
   in response to the request, transmitting credentials to the one or more remote servers to authenticate the system.

14. The system of claim 12, wherein the address comprises an Internet protocol (IP) address.

15. The system of claim 12, wherein the commands comprise application programming interface (API) calls.

16. The system of claim 12, wherein the instance comprises an instance of an operating system executed by the one or more remote servers.

17. The system of claim 16, wherein the operating system is executed within a read-only filesystem image.

18. The system of claim 17, wherein the image includes a pointer to a kernel from an approved list of kernels maintained by the one or more remote servers.

19. The system of claim 17, wherein the image includes a block device mapping that mounts the virtual storage on the first virtual machine.

20. A system for updating a virtual machine on a cloud service, the system comprising:
   at least one communications interface connected to the cloud service;
   at least one memory storing instructions; and
   at least one processor configured to execute the instructions to perform one or more operations, the operations comprising:
      generating a first command to disconnect a virtual storage from a first virtual machine, the first virtual machine having an address, and transmitting the first command to the cloud service using the at least one communications interface;
      after the virtual storage is disconnected, generating a second command to remove the first virtual machine from a cluster including the first virtual machine and transmitting the second command to the cloud service using the at least one communications interface;

generating a third command to offline the virtual machine and transmitting the third command to the cloud service using the at least one communications interface;

after the first virtual machine is offline, generating a fourth command to build a second virtual machine and transmitting the fourth command to the cloud service;

after the second virtual machine is built, generating a fifth command to connect the virtual storage to the second virtual machine and transmitting the fifth command to the cloud service using the at least one communications interface; and generating a sixth command to add the second virtual machine from the cluster with the address of the first virtual machine and transmitting the sixth command to the cloud service using the at least one communications interface.

* * * * *